US008844289B2

(12) United States Patent
Barber

(10) Patent No.: US 8,844,289 B2
(45) **Date of Patent: *Sep. 30, 2014**

(54) SYSTEM AND METHOD OF COOLING TURBINES

(71) Applicant: Baker Hughes Incorporated, Houston, TX (US)

(72) Inventor: Steven J. Barber, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,707

(22) Filed: May 9, 2013

(65) Prior Publication Data

US 2013/0239997 A1 Sep. 19, 2013

Related U.S. Application Data

(63) Continuation of application No. 12/611,379, filed on Nov. 3, 2009, now Pat. No. 8,448,437, which is a continuation of application No. 11/110,403, filed on Apr. 20, 2005, now Pat. No. 7,640,748, which is a continuation of application No. 10/628,035, filed on Jul. 25, 2003, now Pat. No. 6,898,935.

(51) Int. Cl.

| | |
|---|---|
| ***F01K 13/02*** | (2006.01) |
| ***F01B 31/00*** | (2006.01) |
| ***F01D 21/00*** | (2006.01) |
| ***F02C 7/18*** | (2006.01) |
| ***F01D 25/00*** | (2006.01) |
| ***B08B 5/00*** | (2006.01) |

(52) U.S. Cl.

CPC ............. *B08B 5/00* (2013.01); *F05D 2260/232* (2013.01); *F01D 21/00* (2013.01); *F02C 7/18* (2013.01); *F01D 25/002* (2013.01)

USPC ................................ 60/646; 60/657; 415/115

(58) Field of Classification Search

USPC ............................. 60/646, 657; 415/115, 116

See application file for complete search history.

(56) References Cited

U.S. PATENT DOCUMENTS

| | | | |
|---|---|---|---|
| 3,779,933 | A | 12/1973 | Eisen |
| 4,135,947 | A | 1/1979 | Rink |

(Continued)

FOREIGN PATENT DOCUMENTS

| | | | |
|---|---|---|---|
| EP | 1500792 | A3 | 1/2005 |
| GB | 1504650 | A | 3/1978 |
| WO | WO03038243 | A1 | 5/2003 |

OTHER PUBLICATIONS

US Patent and Trademark Office Office Action dated Nov. 21, 2012 issued in U.S. Appl. No. 12/611,379.

(Continued)

*Primary Examiner* — Hoang Nguyen

(74) *Attorney, Agent, or Firm* — Parsons Behle & Latimer

(57) ABSTRACT

A method of cooling a turbine having internal moving components to a predetermined temperature is disclosed. The method comprises taking the turbine offline. While the turbine is offline, nitrogen is flowed through the turbine until the turbine reaches the predetermined temperature while controlling the flow of nitrogen from at least one injection point to prevent damage to the moving components of the turbine by achieving uniform cooling of the internal moving components. Then the flow of nitrogen is stopped. A method and assembly for cleaning a turbine having a deposit formed on an internal surface of the turbine is also disclosed.

6 Claims, 5 Drawing Sheets

(56) References Cited

U.S. PATENT DOCUMENTS

| | | | | |
|---|---|---|---|---|
| 5,209,028 | A | 5/1993 | McDermott et al. | |
| 5,388,960 | A | 2/1995 | Suzuki et al. | |
| 5,827,809 | A | 10/1998 | Mainz et al. | |
| 5,931,721 | A * | 8/1999 | Rose et al. | 451/89 |
| 6,036,581 | A | 3/2000 | Aoki | |
| 6,487,863 | B1 | 12/2002 | Chen et al. | |
| 6,898,935 | B2 | 5/2005 | Barber et al. | |
| 7,640,748 | B2 | 1/2010 | Barber et al. | |
| 8,448,437 | B2 * | 5/2013 | Barber | 60/646 |
| 2005/0172615 | A1 | 8/2005 | Mahr | |
| 2008/0236629 | A1 * | 10/2008 | Sugawara et al. | 134/22.11 |

OTHER PUBLICATIONS

US Patent and Trademark Office, Office Action dated Jan. 18, 2013 issued in U.S. Appl. No. 12/611,379.

Praxair Technology, Inc., "Nitrogen Services Purging, displacing, blanketing, drying, cooling, heating, pressure testing, leak testing—and more—with 99.9+% pure nitrogen gas," 1998.

North American Electric Reliability Council, "Reliability Assessment 2002-2011—The Reliability of Bulk Electric Systems in North America," Oct. 2002.

Search Report from corresponding EP Application No. 1 500 792 A3 dated Feb. 2, 2007.

US Patent and Trademark Office Office Action dated Dec. 22, 2008 issued in U.S. Appl. No. 11/110,403.

US Patent and Trademark Office Final Office Action dated Jun. 16, 2009 issued in U.S. Appl. No. 11/110,403.

US Patent and Trademark Office Office Action dated Apr. 1, 2004 issued in U.S. Appl. No. 10/628,035.

US Patent and Trademark Office Office Action dated Sep. 27, 2004 issued in U.S. Appl. No. 10/628,035.

* cited by examiner

SYSTEM AND METHOD OF COOLING TURBINES

RELATED APPLICATIONS

The present application is a continuation of U.S. patent application Ser. No. 12/611,379, filed on Nov. 3, 2009, which is a continuation-in-part of U.S. patent application Ser. No. 11/110,403, filed Apr. 20, 2005, now issued as U.S. Pat. No. 7,640,748, which is a continuation of U.S. patent application Ser. No. 10/628,035, filed on Jul. 25, 2003, now issued as U.S. Pat. No. 6,898,935, each of these applications are incorporated herein by reference in their entirety.

FIELD OF THE DISCLOSURE

This disclosure relates to the field of maintenance of apparatus having moving internal components, namely in the power generation industry.

BACKGROUND

In the power industry, electricity is produced with a spinning turbine that is turned at high speeds to generate electricity. This turbine can be turned by water, by gas, or by high temperature steam. The steam turbine is driven by high temperature steam from a conventional boiler reactor or nuclear reactor at speeds averaging 1800 to 3600 rpm. Many of the modern stream turbines operate at temperature in excess of 1,000° F.

Approximately 49 percent of the U.S. power generation in 2003 was coal-fired and 28 percent of the generation from nuclear fuel sources. Both fossil and nuclear steam turbines experience substantial cool down time delays associated with planned major outages, planned minor outages, and unplanned outages. A typical steam turbine requires a minimum of one week to cool down to ambient temperatures using the current methods of shutdown and outage disassembly. This inefficiency represents a substantial amount of lost production and associated revenues for a given generating unit on an annual basis.

Power plant steam turbine metal temperatures cool down at a fairly rapid rate while steam is flowing through the turbine and the generator is connected to the electrical grid. However, most all plant designs include provisions to close the main steam turbine valves when the turbines are removed from service. These design provisions are included for many reasons, one of which is to prevent slugs of water from traveling through the steam turbine and causing damage to the blades and other components. The technical term for this is “turbine water induction” and the American Society of Mechanical Engineers (“ASME”) developed a steam turbine design standard many years ago after turbine water induction failures were reported in the industry.

When steam turbines are removed from service the emergency stop valve and the control valves remain in the closed position. This restricts steam flow through the steam turbine and results in a “bottled up” steam turbine. Typical steam turbines with weights of 125 to 200 tons and operating temperatures of 1000° F. have significant thermal mass. After removing the steam turbines from service, the shell and rotor temperature remains above 700° F. at many locations while the turbine is “bottled” up for many days. Even after one week of conventional cooling down methods, it is not uncommon to measure temperatures in excess of 150° F. on the rotor and thick shell locations.

The prior art fails to provide for a cooling down large steam turbines at electrical generation stations. Steam turbine sizes increased rapidly from 1950 to 1970. During this period, manufactures focused on minimizing rotor stresses and reducing large temperature changes to that result in shell cracking. Moreover, the prior art failed to minimize turbine outages to the extent that commonly exists today. Therefore, there exists a need to cool down steam turbines and to optimize outage time.

The prior art has approached these problems by pre-staging and mobilizing while the turbines are in a cooling down period. Generally, the cool down period in the prior art is concurrent with the disassembly of the steam turbine and occupies the first week of most outages. In recent years the electric utility industry has attempted to reduce the costs associated with turbine outages. The prior art has focused on rapid disassembly and repair techniques while accommodating this cool down period. Therefore, a need exists to improve and optimize outages associated with steam turbines in the electric utility industry that would offer cost incentives associated with electric production including replacement power costs, labor costs, repair costs, and plant operating availability requirements.

There are many factors that attribute to the cool down time of a steam turbine. When turbines are taken off-line or removed from service, electrical breakers are opened, thus removing the generators from the electrical grid. Next, the main steam stop valve and control valves shut automatically to prevent damage due to water induction. The turbine is de-pressurized minutes after shut-down but the steam turbine is in effect “bottled up” as it related to metal temperature. There is no substantial cooling fluid available internally and the turbine cools very slowly as heat escapes only through the shell and outer insulation. After a steam turbine is removed from the grid, the turbine is allowed to spin freely from its nominal operating speed down to approximately 90 rpm in twenty to thirty minutes.

During the spin-down there is usually only minimal steam flow in the reverse direction through the high pressure turbine to prevent excessive temperatures due to steam stagnation. The lube oil system remains in operation while the “hot” turbine is on turning gear until the first stage metal temperature reaches approximately 500° F. This takes approximately 40 to 80 hours depending on the turbine. At this time the oil system can be taken offline and the turbine can be completely disassembled. The initial outer and inner shells are often removed with some component temperatures at several hundred degrees Fahrenheit. The turbine rotor usually is removed and placed on the stands near the turbine with internal temperatures exceeding 150° F. Most high pressure turbine rotors are not physically removed from the inner shell casing until five to eight days after the unit is taken off-line.

Though there is no consistent method of turbine disassembly, the turbine is disassembled hot and cooling occurs after disassembly in the prior art. The current practices are followed to reduce the metal temperatures without damage to the turbine. In the prior art, cooling down the turbine assembly can only occur as long as steam flows through the turbine.

Because these methods require workers to disassemble the turbine prior to the cool down process, cool down the turbine and disassembly may occur at temperatures between 200 and 500° F. The rate of turbine cool down depends on the willingness of workers to work on hot components, safety concerns, rigging limitations, and insulation removal activities. On large steam turbines, meaningful turbine cooling of the shell is usually not achieved until the crossover pipe between the high pressure turbine section and/or intermediate pressure turbine sections and the low pressure turbine section is removed. This is usually not attempted until the turbine's metal temperatures are less than 600° F. Once the crossover pipe is removed, the rate of cooling due to air convection increases dramatically. In summary, this method does not provide reasonable, efficient, or adequate cooling for outage and cost optimization.

The prior art offers two methods to improve the cooling time associated with large steam turbines. The primary method of reducing the cool down time is to force cool the turbine components prior to bringing the turbine off-line. This typically consists of reducing the main steam temperature just prior to removing the steam turbine from service. The main steam temperature is reduced by closing the extraction steam sources to the feedwater heaters, reducing steam temperature through attemperation, and slowly lowering the steam temperature to near saturation temperatures. This forced cool down method is expected to be used on 400 megawatt and larger units.

Though this method of forced cool down removes a substantial amount of heat from the steam turbine, the saturation temperature limitations and potential for water induction fails to provide for a substantial cool down of the steam turbine. This method only cools the turbine down from over 1000° F. to temperatures between 700-900° F. in the high pressure turbine section of the turbine. This only saves about one to about one and one half days in the unit's outage shutdown.

Moreover, this method offers the additional problem that even after this forced cool down, the operator cannot shut off the lubrication system on the turbine and the operator cannot disassemble the turbine until the metal temperatures are between 500-600° F. Furthermore, there is a significant hazard with disassembling the turbine at this high temperature.

In addition, using this cool down method while the unit is still in service may fail because the turbine operations will trip for several reasons. Therefore, this method of forced cool down is unable to offer an efficient method of cooling down the turbine to allow maintenance of the turbine. Moreover, the calibration of station instrumentation, the condition of level detection devices, the inadequate operational staff during shutdown, the system power levels and load changes, the boiler tuning, and the other plant configuration matters will further limit the usefulness of this method.

The second method of the prior art is air cooling. Various air horns are placed at limited internal access points throughout the turbine. This method does not provide efficient cool down of the turbine because air at near ambient pressure does not provide enough heat transport and non-uniform distribution of cooling. This method results in humping, which is stagnant steam distributing in large turning shells in a manner that stratifies the steam and results in convective heating that is cooler on the bottom and warmer on the top. This problem occurs when the turbine is "bottled up" with hot steam and the metal is slightly longer at the top of the shell than at the bottom of the shell. This misalignment can cause rotor contact.

This method is also deficient because of limited accessibility, limited compressed air capacity, and non-uniform distribution of cooling throughout the turbine. These three factors result in not only a lack of cooling capacity but problems with shell humping and non-uniform component cooling. Moreover, two limitations of forced cooling using air injection are adequate cooling capacity and uniform cooling. This method has only been shown to save minimal time in the shut down of steam turbines.

The electric utility industry has experienced dramatic changes over the past two decades and continues to encounter significant competitive changes associated with the generation of electricity. These competitive changes are a driving force to produce electricity more efficiently and cost effectively. Electric utility power plant outages are an integral part of the electric power industry and therefore are a critical component in evaluating electrical demand and the ability to satisfy the demand through generation resource allocation.

These outages consist of both planned and unplanned events that have variable time durations depending on various factors. The cost consequences of outages is highest during summer and winter peak power demand periods, whereas outage costs during other time periods are more predictable. Other factors that influence outage consequences include reduced electric capacity, power plant age, wholesale market price and volatility, environmental regulations, electric deregulation, and other factors. With respect to power plant age, it is noted that the average age of most of the large power plants in the U.S. is over 30 years which emphasizes the importance of regular scheduled maintenance outages which in turn requires time and money. Therefore, a need exists to minimize the costs associated with an outage by reducing the amount of time needed to service the turbines.

Flows of nitrogen have been used in different arts, but this technology has not been implemented on devices with internal moving parts. In the chemical, petrochemical and oil refining industry, various reactor vessels that operate at 1,000° F. are taken off line for maintenance. These processes are used to reduce crude oil to useable end products. These large reactor vessels contain various catalysts that aid the crude processing. These catalysts become spent and are required to be periodically replaced. The reactor vessels are cooled down from their operating temperatures over 600° F. to less than 100° F. The process equipment being cooled in this art are reactor vessels that are stationary and static with no moving parts. Care must be taken to not cool the metal to fast, which can cause metal fatigue and cracking from stresses caused from shocking the metal. For vessels with no moving parts, liquid nitrogen has been forced through vessels having metal surfaces at greater than 350° F. Most metal can be cooled down at rates of 75-100° F. per hour.

In the early 1980s, Union Carbide Industrial Services used liquid nitrogen to cool down reactor vessels instead of recycling process nitrogen and hydrogen gases through the units compressor systems. In operation, the plant systems allowed recycling the gas through the reactor to absorb heat, and then passing that gas through the system's heat exchangers to cool the gas. The compressors pumped the gas back through the reactor to force cooling. This required four to six days to obtain temperatures below 100° F.

In contrast, a steam turbine operates under very dramatic conditions with a large spindle spinning at 3600 rpm inside a stationary shell. The heat shrinkage of the stationary shell to the spindle and the stationary shell to the spindle blades of the turbine is a factor. If the cooling is not completed with careful control so that all parts of the machinery cool at the same rate, damage can occur to the machine with spinning parts coming into contact with stationary parts, humping can occur, and the weight of the turbine can shift from one end to the other too fast, thus causing damage. Therefore, a need exists to provide for a cool down of a turbine with moving internal parts such that the cool down rate may be controlled.

The purpose of cooling and shutting down a turbine is often due to a decline in performance due to deposits on the turbine blades. This may be recognized by the operator due to a gradual loss of power production by the machine and increased fuel consumption.

The deposits on the blades can be a range of contamination products, depending on, for example, the fuel gas and air intake filtration capabilities for gas turbines, and the steam impurity content for steam turbines. These deposits can include dirt or soil, copper oxide, sand, coal dust, insects, salt oil, turbine exhaust gas and combustion deposits such as sulfur oxide. Some of these contaminates are corrosive to the turbine, while oily hydrocarbon type deposits that form on gas turbines increase the ability of other contaminants to cling to the turbine parts. Removal of this oily glue substance can aid in the production recovery of the gas turbine.

Gas turbine deposits are often the result of the combustion of natural gas or flue gas from an up stream coal combustion process that can be used to power the turbine. The operation leaves sulfur residues, thought to be sulfur dioxide deposits, on the gas turbine blades that can become corrosive and in extreme cases, and can cause imbalance in the turbine and excessive vibrations. The prudent gas turbine owner, periodically completes a wash of the turbine blades to remove these sulfur dioxide deposits. Other types of turbines can also periodically be cleaned. For example, steam turbines are sometimes cleaned to remove copper oxide deposits that occur due to copper carried in the production steam/water vapor.

There are two common practices in the power industry to clean turbine blades. One method, mechanical cleaning by grit blasting after the turbine is disassembled, can be employed on both steam turbines and gas turbines. The cleaning media for grit blasting can include uncooked rice or ground up nut shells. However, because this method involves disassembly of the turbine, it can be a time consuming and costly process.

Another turbine cleaning option is the injection of rice or nut shells into the turbine while it is operating at a reduced load. This process is usually carried out after the water washing practice.

The second common method for cleaning turbine blades involves a liquid cleaning process using micro-emulsion water based detergents. The cleaning agent used can depend on the type of deposits being removed and is often pre-approved by the turbine manufacturer. Specifically with respect to gas turbine cleaning, there are several emulsion based cleaners that are well known in the art for washing gas turbine blades.

During the turbine washing process, the turbine can be partially or completely de-energized (e.g., the turbine is taken offline and the turbine blades are allowed to turn largely by inertia as opposed to being driven by forced steam or air; although a mechanical means, such as a turning gear off base air compressor drive, can sometimes be used to keep the bearings lubricated, as is well known in the art). The cleaning solution can be, for example, a 5-10% cleaning agent mixed with clean water. An issue in these applications is water quality and purity. Water quality should be, for example, less than 100 ppm dissolved solids, less than 10 ppm chlorides, less than 25 ppm sodium and a pH of 6-8. Poor water quality leads to more inorganic deposits on the turbine blades, chloride stress corrosion occurring on turbine parts and shortened turbine life.

The cleaning solution can be applied by using either a permanent spray system or a hand held spray system. The chemical spraying can be completed with the machine on turbine gear or crank speed. To prevent thermo shock, the main turbine shaft temperature can be under 200° F. using ambient (50°-80° F.) water. If using 150°-200° F. water, the main turbine shaft temperature can be under 300° F.

The contact time of the cleaning solution with the turbine can depend on the amount of debris to be removed. Once it has been determined that the system is clean, a water rinse (e.g., substantially pure water) can be added to wash off remaining cleaning solution.

In another field of technology, the practice of injecting small amount of atomized cleaning compounds into saturated steam has been used for several years to chemically clean piping. Most of these applications were used for the cleaning of oxygen or fuel gas piping for the removal of preservatives and iron oxides using water based mild alkaline and weak acidic solution. These applications were completed to clean the interior pipe walls, but are not known for use with turbines. Using an alternate gas in place of steam, such as nitrogen, was not attempted because of the type of cleaning compounds used and the readily available steam supply.

That steam based chemistry of the above process depends heavily on dissolution of the contamination on the pipe walls by the water solution. Examples of well known water cleaning agents include alkalines, which can be used for degreasing the pipe walls, and citric and EDTA acids, which can be used to dissolve iron oxide deposits. These water based cleaning methods are heavily dependent on the water droplets in the saturated steam to carry and disburse the cleaning compounds. One reason that nitrogen was not previously used in this cleaning process was because it is a dry gas and can be relatively expensive compared to readily available saturated steam.

Similar aerosol techniques have been used for many different purposes, such as die lubrication, spray coatings, moisturizing, humidification, flue gas conditions, dust control and for removing hydrocarbon vapors after shutdown of oil or gas refineries. In one such process, a hydrocarbon refinery has been purged with nitrogen gas, then purged with steam, where cleaning compounds were added as an aerosol to the steam in order to aid in encapsulating hydrocarbons.

SUMMARY

The present disclosure offers a cool down method applicable to rotating and moving equipment in the electric power generating industry including steam turbines. By using a flow of nitrogen, preferably a forced flow of nitrogen, the present disclosure may improve the efficiency of power plant outages by reducing the cool down time associated with large steam turbines. This cool down period can represent a substantial cost if the outage occurs at critical electrical power market conditions. This cost becomes much more substantial and can result in extreme costs if the market conditions increase over $50 per megawatt.

Nitrogen is pumped as a gas into a moving steam turbine machine in a controlled manner. This method prevents stress cracking the turbines metals without causing the machine to warp, humping, or have uneven cooling across the machine that could cause moving parts to come into contact with non-moving parts. This method of this disclosure is also capable of preventing overspeeding of the blades of the turbine above their design speed.

The methods of the present disclosure also allow for faster shutdown for cleaning. Power plants shutdown and need to cool the turbine for many reasons including cleaning. Prior to cleaning, the steam turbine metal temperature may need to be below 175° F. Therefore, the present disclosure provides for greater opportunity to clean the internal components of the turbine. In the preferred embodiment, a steam turbine coming off production will have a temperature profile of 500-1,000° F. across the machine.

The method of the present disclosure provides a flow of nitrogen from a nitrogen pumper to a flow control station installed under the steam turbine. The nitrogen pumper pumps the nitrogen through a single piping header into the area under the steam turbine. The gas is divided into different flow streams in a nitrogen flow control station, which is design to control the nitrogen flow and temperature being delivered to different sections of the turbine.

The present disclosure may also take advantage of the many different types of instrumentation that already exist on the turbine to monitor temperature, vibration, and growth or shrinkage of the machine as it operated. As the nitrogen gas is introduced into various ports or connections on the steam turbine, these instruments are monitored across the machine to monitor how the machine is reacting to the rate that the nitrogen is being introduced. The ports or connections used on the turbine for nitrogen injection will depend on the various designs that exist in the power industry today.

Therefore the different methods discussed herein provide options for applying the nitrogen without damaging the internal, moving components of the turbine by uneven cooling, rapid cooling, or over-spinning. With the nitrogen flow control station, nitrogen can be introduced to different areas of the turbine at different temperatures and/or different flow rates and cooling or heating can be accomplished at different rates in different areas of the turbine so that the machine is cooled down evenly without damage.

The force cooling of power plant steam turbines is significantly different than the cooling down of process equipment. The rate of metal contraction in a large steam turbine is significant. A steam turbine is a large piece of equipment that is designed to grow and shrink over a foot in length as it goes on and off production. The growth of the steam turbine varies with size from the simple equation:

$$\Delta\text{Length}=\alpha\text{Length of steel turbine casing}\times\Delta\text{Temperature in }^{\circ}\text{ F.}$$

$\alpha$ is the coefficient of thermal expansion for a given material and is in the $10^6$ range. Therefore, the typical growth with from about two inches to about 12 inches on a very large turbine.

Because the clearance tolerance between the casement and the spindle is so tight, the rate of shrinkage of the different parts of the machine is important to the cool down process. Thus the control of the cool down temperatures is significant. It is envisioned that the methods of the present disclosure will be able to reduce the cool down period from the five to eight days of the previous methods to less than approximately two days, preferably less than about 36 hours. The methods of the present disclosure can also offer a costs saving by providing a quicker shutdown or turnaround time and by extending the production of electricity during the cool down process.

The methods, designs and techniques of the present disclosure may be incorporated into or used on a variety of turbines via a variety of turbine connections that are different depending on the manufacturer of the turbine. The present disclosure is described in conjunction with one embodiment of the disclosure, but those skilled in the art recognize that the teachings herein are equally applicable to different embodiments with varying connections.

In the preferred embodiment the present disclosure provides a method of cooling a steam turbine having internal moving components to a predetermined temperature, wherein the steam turbine comprises a main steam inlet piping connected to the turbine and a cold reheat line connected to the turbine such that a flow of steam first moves from the main steam inlet piping to the turbine and then the flow of steam moves from the turbine to the cold reheat line during operation, the method which includes the steps of stopping the flow of steam, introducing a flow of nitrogen to the turbine until the turbine reaches the predetermined temperature while controlling the flow of nitrogen to prevent damage to the moving components of the turbine, and stopping the flow of nitrogen. This method may also include a hot reheat line connected to the turbine and a condenser vacuum relief line connected to the turbine such that a flow of steam first moves from the hot reheat line to the turbine and then the flow of steam moves from the turbine to the condenser vacuum relief line during operation, wherein the flow of nitrogen in also moves from the hot reheat line to the turbine and then the flow of nitrogen moves from the turbine to the condenser vacuum relief line.

The method may also include a main steam inlet piping drain line connected to the main steam inlet piping, the method wherein the flow of nitrogen moves from the main steam inlet piping drain line to the main steam inlet piping. In a preferred embodiment, the method includes a cold reheat drain pots connected to the cold reheat line, the method wherein the flow of nitrogen moves through the cold reheat drain pots to the cold reheat line. Each of these methods benefits from controlling the flow of nitrogen with a computer control system.

The present disclosure also includes a system for cooling a steam turbine to a predetermined temperature using a flow of nitrogen, the system including a steam turbine, a main steam inlet piping connected to the turbine, a cold reheat line connected to the turbine, and a control station for controlling the flow of nitrogen to prevent damage to the moving components or the turbine wherein the steam turbine, the main steam inlet piping, and the cold reheat line are adapted to accommodate the flow of nitrogen. This system may also include a hot reheat line connected to the turbine and a condenser vacuum relief line connected to the turbine wherein the hot reheat line and the condenser vacuum relief are adapted to accommodate the flow of nitrogen. In another embodiment, the system may also include a main steam inlet piping drain line connected to the main steam inlet piping wherein the main steam inlet piping drain line is adapted to accommodate the flow of nitrogen. This system may also include cold reheat drain pots connected to the cold reheat line adapted to accommodate the flow of nitrogen. The controller of this system is a computer control system wherein the computer control system is adapted to control the flow of nitrogen in a preferred embodiment.

This disclosure also provides for a more efficient and cost effective method of operating a power plant by using the methods listed above to reduce downtime by cooling each steam turbine using the inventive concepts as disclosed and claimed herein.

The present disclosure is directed to a method of cooling a turbine having internal moving components to a predetermined temperature. The turbine comprises injection points. The method comprises taking the turbine offline. While the turbine is offline, nitrogen is flowed through the turbine until the turbine reaches the predetermined temperature while controlling the flow of nitrogen from at least one injection point to prevent damage to the moving components of the turbine by achieving uniform cooling of the internal moving components. Then the flow of nitrogen is stopped.

The present disclosure is also directed to a method of cleaning a turbine having a deposit formed on an internal surface of the turbine. The method comprises taking the turbine offline. Nitrogen gas is flowed through the turbine while the turbine is offline. A cleaning aerosol is introduced into the nitrogen gas. The surface of the turbine is contacted with the aerosol to clean the deposit from the surface.

The present disclosure is also directed to a turbine cleaning assembly. The turbine cleaning assembly comprises a turbine and a gas inlet connected to the turbine. A nitrogen gas source is in fluid communication with the gas inlet. An aerosol generator is also in fluid communication with the gas inlet. The aerosol generator is configured to inject an aerosol comprising a majority of droplets having a diameter of 100 microns or less into the gas inlet.

BRIEF DESCRIPTION OF THE DRAWINGS

The accompanying drawings, which are incorporated in and form a part of the specification, illustrate the embodiments of the present disclosure, and, together with the description, serve to explain the principles of the disclosure. In the drawings.

Figure 1:
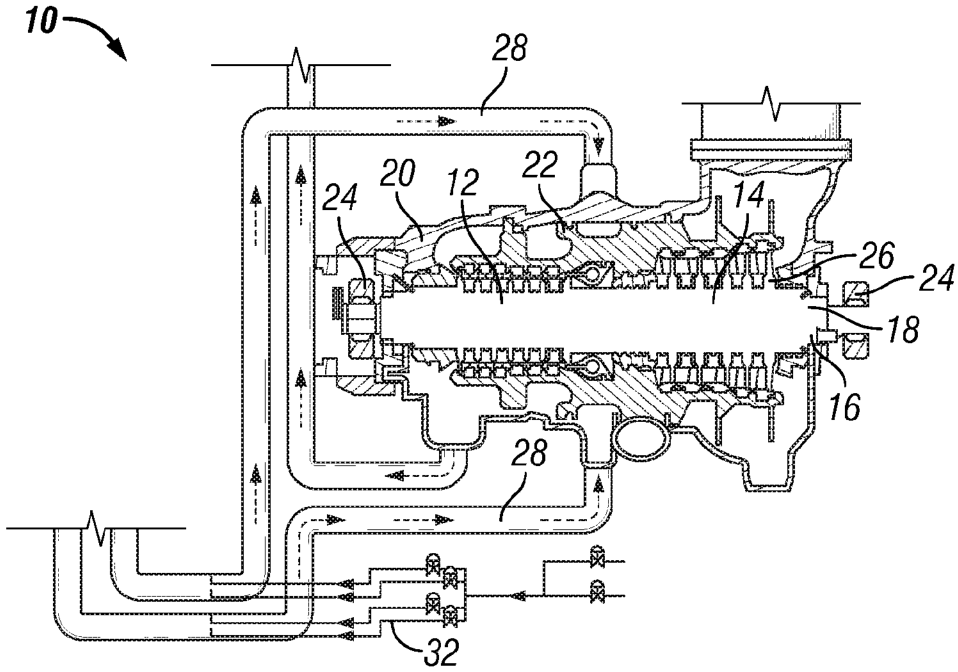
FIG. 1 is diagram including a cross sectional view of an embodiment of the present disclosure.

It is to be noted that the drawings illustrate only typical embodiments of the disclosure and are therefore not to be considered limiting of its scope, for the disclosure encompasses other equally effective embodiments. Nitrogen injection points will vary due to the different designs and piping configurations that exists on the existing turbine in the power production market.

DETAILED DESCRIPTION OF PREFERRED EMBODIMENT

The present disclosure offers forced cooling of a flow of nitrogen such that a steam turbine may be cooled in a shorter period of time. In a most preferred embodiment, it is expected that a typical large fossil steam turbine unit between 200 and 850 megawatt ("MW") may be cooled in less than about 48 hours, more preferably less than about 36 hours, most preferably about 24 hours. In fact, it is envisioned that a cool down could be accomplished in as little as about four to about 15 hours in a most preferred embodiment. The time required is dependent on the overall mass of the turbine and the nitrogen flows that can be obtained. The cooling time will be determined by the difference between the time of operation and the time at which the turbine has cooled down from the range of about 350° F. to about 700° F. to a predetermined temperature such as less than about 100° F. to about 200° F. It is expected that substantial differences between turbine sizes, manufactures and power plant system will exist and therefore affect this cooling time.

In another embodiment, the methods and systems of the present disclosure may be used for pre-heating of the steam turbine as well. This may result in some start-up time savings of about 4 to about 40 hours, depending on the unit considered and the type of power plant start-up performed. Once this technology is implemented in a plurality of locations, there will be an overall capacity increase of U.S. electric power generation for National Electric Reliability Council ("NERC") regions or for individual utilities. After studying the outage schedule produced for each NERC region and an expected outage time savings for the combined power plants, it is likely that being able to put power plants back on-line sooner by the methods of the present disclosure may result in more overall electric energy produced by the U.S. as a whole or by a separate region. The present disclosure may also be used in combination with other technologies. For example, nitrogen injection may be used on other power plant equipment for purposes of corrosion prevention.

In a preferred embodiment, the present disclosure includes a braking device to allow controlling the turbine rotation speed at a turning gear speed. These designs would address the need to not over spin the turbine with the nitrogen inject and preferably maintain a controlled and constant rotation speed less than operational design spin but sufficient to facilitate the flow of nitrogen through the machine. This device would be installed on the turbine/generator shaft to control the speed of the turbine-to-turbine gear speeds. This provides enough tortional resistance to maintain the turbine at turning gear speeds and reduce the damage to the turbine in the event that the turbine rotor expands or contracts relative to the shell.

FIGS. 1-5 show several different embodiments of the present disclosure with respect to a steam turbine. Those skilled in the art will recognize that the concepts disclosed and taught herein are applicable to steam turbines and similar with internal, moving elements. Nothing herein is intended to limit this teaching to any particular type of steam turbine. The inventive aspects of using the injection points of steam turbines in this manner is equally applicable to any manufacturer's turbines.

This steam turbine 10 features an opposed flow high pressure turbine section 12/intermediate pressure turbine section 14 on a single turbine 10 and an opposed flow low pressure turbine section 16 on a single rotor 18. This design is exemplary of the large steam turbines in the United States and around the world. This turbine 10 is typical of the materials, weights, sizing, rotors, and shells of other makes and models. Those skilled in the art recognize that variations will exist depending on the size of other steam turbines, shell thickness, flow configuration, manufacture, and power rating.

FIGS. 1-5 show different arrangements of flow paths for the flow or flows of nitrogen throughout the turbine 10 for the purpose of cooling. These flow paths are examples of the methods of cooling a steam turbine. Of note, the direction of the flow of nitrogen, the size and capacity of the piping, the heat load stratification of steam turbine shells and rotor, the location of nitrogen injection, the location of nitrogen discharge, the confined space and oxygen depravation considerations, the flow capacity of nitrogen, and the cooling transport affect the teachings of the disclosure.

The path of the flow of nitrogen through the turbine 10 is a focus of the disclosure. The forced cooling can be accomplished in any path/flow direction. However, the steam turbine 10 will cool at a faster rate if the flow of nitrogen is injected on the cooler side of the turbine shell, shown as outer shell 20 and inner shell 22, and discharged nearest the location of the highest turbine shell metal temperature. This provides the highest nitrogen-to-metal mismatch temperature throughout the steam turbine 10.

The second item to consider related to the nitrogen flow direction is the speed of the steam turbine 10. The "free spinning" of the turbine/generator set affects the cooling time of steam turbines. The steam turbine is by design a nearly frictionless mass of rotating machinery. The turbine system is designed to reduce rotational losses in an effort to reduce power losses, reduce bearing 24 size, and generally increase the overall efficiency of the steam turbine 10. The bearings 24 of a large steam turbine are a machined component and provide a near frictionless surface.

Typically all bearings 24 in a steam turbine 10 are babbit bearings including the thrust bearings. All bearing surfaces of modern steam turbines include forced lubrication and thermocouples for precise monitoring of bearing temperatures. Therefore, the flow of nitrogen will have direct relationship with speed. In some embodiments, the flow of nitrogen is in the opposite direction to counteract the rotational speed effect of the blades 26 of the turbine 10 created by the flow of nitrogen.

The turbine 10 shown in FIGS. 1-5 is an opposed flow design. Steam turbines are designed to operate at normal speeds up to 3600 rpm while avoiding certain turbine speeds associated with resonant turbine rotor frequencies. Precise turbine rotor frequency ranges are available from the manufacture and will vary with design.

During the cooling process, the vibration levels associated with the speed of the blades 26 of the turbine 10 are not substantially different with nitrogen than steam. Therefore, during nitrogen forced cooling the turbine speed can be less than, for example, 3600 rpm and outside the vibration frequencies for a given turbine.

Nitrogen forced cooling can be accomplished at various speeds, depending on the desired cooling flow. Rotor 18 speed may increase rapidly if the flow is increased or unbalanced suddenly. Therefore, it is important to not overspeed during operation and during cool down to prevent permanent damage to the rotor 18 and blades 26. Therefore, it is important to have a device or method of controlling the flow of nitrogen to prevent overspeed conditions.

The size of the piping connections, such as the main steam inlet piping 28 and the cold reheat line 30 shown in FIGS. 1-5, and their capacity limitations are important to determine the nitrogen cooling capacity. If desired, the methods can generally employ the existing standard piping available at the steam turbines.

Because steam turbines transfer work in the form of steam energy to mechanical machine inertia or torque, the steam pressure and temperature in the form of heat energy or enthalpy is reduced in the process of flowing through each set of turbine blades during operation. Therefore, there is stratification from about 1000° F. to about 600° F. for most high pressure turbine sections and intermediate pressure turbine sections.

Therefore, the methods of the present disclosure can benefit from producing a flow of nitrogen in the same direction as an increase in metal temperature. This provides cooling flow through the steam turbine 10 and reduces the nitrogen gas to metal mismatch temperature. The nitrogen to metal mismatch temperature and its associated steam to metal mismatch temperature may be a surface metal stress limit for the turbine shell 22 and the rotor 18. Steam turbines are designed in accordance with published steam to metal mismatch temperatures. The present disclosure provides for cooling while staying under the stress limits published by the turbine manufacture.

Moreover, the location of injection or introduction of the flow of nitrogen can potentially be important. Factors including the size of existing piping or connections, the length of piping runs, the location on the turbine, the ease of connection, the proximity to the nitrogen pump truck, and the turbine metal temperature should be considered.

The location of the nitrogen discharge may also potentially be important. Factors to consider include confined space safety, oxygen depravation, transport to atmosphere, and existing steam turbine and power plant piping. In general, it is preferable to accommodate the location of existing piping and connections and the location for discharge to atmosphere.

Turning to the confined space and oxygen depravation considerations, the use of large volumes of nitrogen in a power plant may require special consideration of confined space requirements for a given power plant and utility. It can potentially be important to vent the nitrogen in a manner that will not create an oxygen depravation issue in a confined space.

The cooling rate of the steam turbine is primarily influenced by the amount of flow of nitrogen through the turbine given that the heat capacity and temperature differential will be affected by a given turbine design and operating condition. In the present disclosure, the speed of the blades 26 of the turbine 10 will be the notable factor associated with the maximum pounds of the flow of nitrogen that can be controlled.

Focusing on FIG. 1, the turbine 10 includes an introduction of the flow of nitrogen at the main steam inlet piping drain lines 32 connected to the main stream lines 28. The flow of nitrogen moves from the main steam inlet piping drain lines 32 to the main stream lines 28 and then to the turbine 10. The flow of nitrogen then moves from turbine 10 to cold reheat line 30 with an exhaust at the cold reheat safety relief valve on the boiler roof (not shown). This method provides for nitrogen forced cooling with minimal piping connections and plant impact.

It is recognized that the main steam inlet piping drain lines 32 should be in-service to conform to the ASME guidelines for prevention of water induction. However, once the main stop valve (not shown) is closed and blades 26 of the turbine 10 are placed on turning gear, this piping system is available for use in the cool down process of the present disclosure.

The flow direction in this embodiment is reverse of the more efficient, forward direction and can be limited by the steam turbine surface metal to nitrogen gas mismatch temperature. This method also includes the cooling of the high pressure turbine section 12 only. There is no nitrogen flow through the intermediate pressure turbine section 14 and low pressure turbine section 16 turbine sections. The cooling of the intermediate pressure turbine section 14 and the low pressure turbine section 16 can be through conductive means. As the high pressure turbine section 12 and rotor 18 cool, the heat flux moves in the direction of the high pressure turbine section 12, essentially pulling heat from the intermediate pressure turbine section 14 and the low pressure turbine section 16. The advantage of this embodiment is the relative simplicity and ease of implementation on existing turbine systems.

Figure 2:
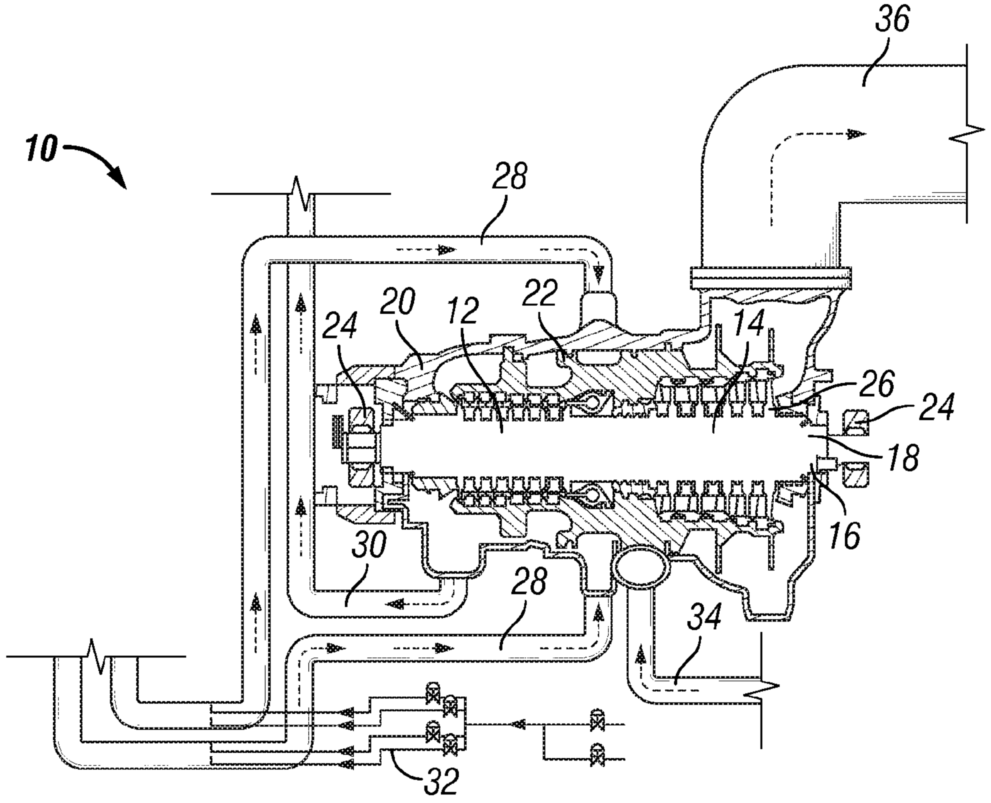
FIG. 2 is diagram including a cross sectional view of an embodiment of the present disclosure.

Turning to FIG. 2, the turbine 10 is shown in another embodiment. This embodiment includes additional piping connections: a hot reheat line 34 and a condenser vacuum relief line 36. This system and the method of its use include the same elements as shown in FIG. 1, but include a second flow path through the intermediate pressure turbine section 14 and downstream low pressure turbine section 16. The flow of nitrogen flows from the hot reheat line 34 to the turbine 10 and from the turbine 10 to the condenser vacuum relief line 36.

Both the high pressure turbine section 12 and the intermediate pressure turbine section 14 have flow directions in the less efficient direction, referred to herein as forward. However, this efficiency is balanced by the simplicity and relatively low-cost for implementation of this design. It is important to monitor and control the speed of the blades 26 of the turbine 10 in this embodiment.

Figure 3:
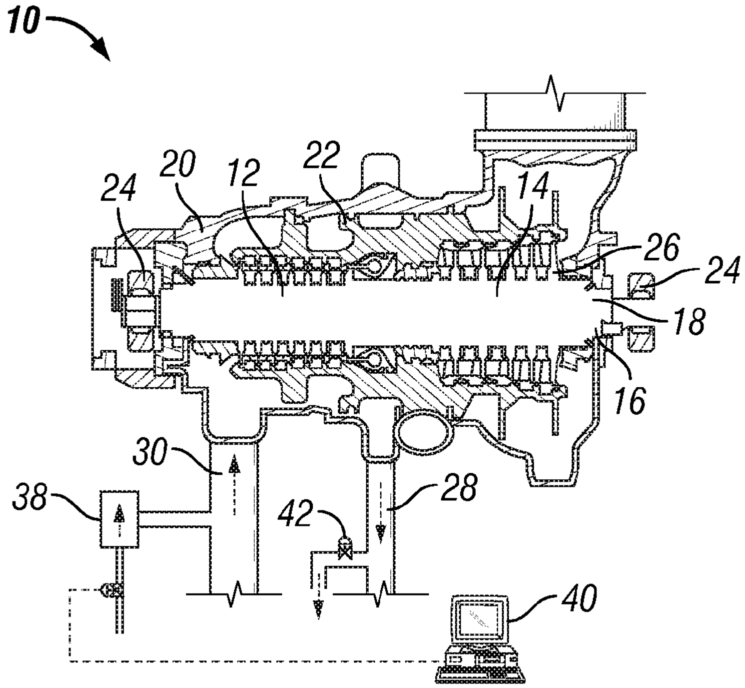
FIG. 3 is diagram including a cross sectional view of an embodiment of the present disclosure.

Referring to FIG. 3, an embodiment of the present disclosure is shown such that the flow of nitrogen is in the reverse direction through the high pressure turbine section 12 only. The flow of nitrogen is injected at the cold reheat line 30 from cold reheat drain pots 38 controlled by the controller 40. The flow of nitrogen moves from the cold reheat line 30 through the turbine 10 and from the turbine 10 to the main steam inlet piping 28.

The flow of nitrogen is then discharged to atmosphere through the blow down valve 42. Modern blow down valve 42 piping can either flow to the condenser or the roof in most cases. The roof is simpler and does not typically require piping modifications.

This embodiment is the first to show a controller 40, but the advantage of using a controller to monitor and moderate the flow of nitrogen through the turbine 10 is an important aspect of the disclosure. The controller 40 is adapted to control the flow of nitrogen to prevent damage to the moving components or the turbine, including uneven cooling, rapid cooling, or over-spinning.

Figure 4:
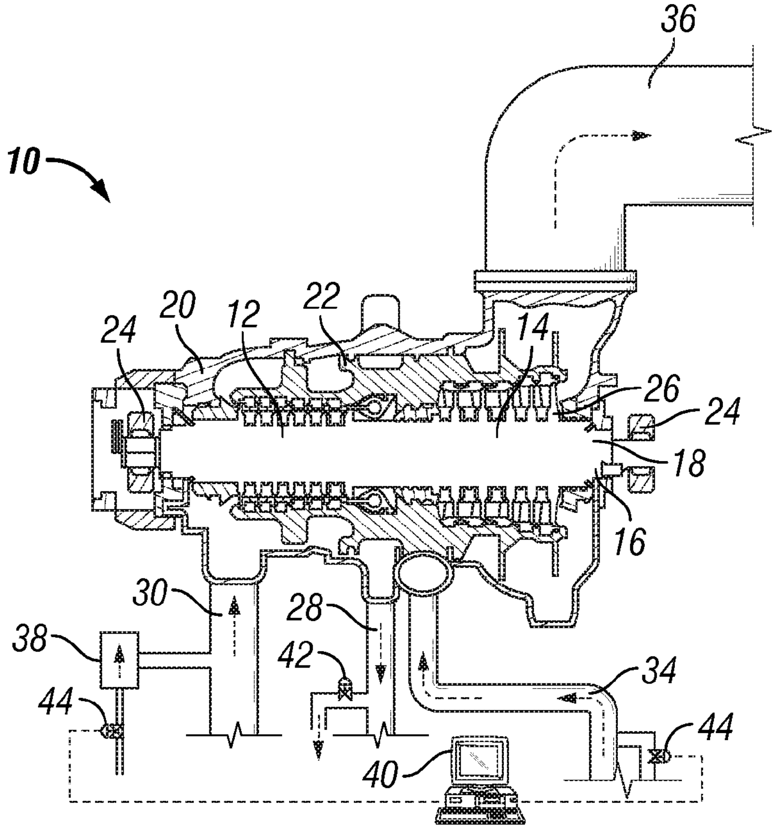
FIG. 4 is diagram including a cross sectional view of an embodiment of the present disclosure.

Turning to FIG. 4, another embodiment is shown. This system and method provide a flow of nitrogen to the high pressure turbine section 12 in the reverse direction and a forward flow of nitrogen to the intermediate pressure turbine section 14 and the low pressure turbine section 16. This provides a higher overall nitrogen gas flow at a lower turbine speed due to the counteracting effect of the work or torque on the high pressure turbine section 12 opposing the intermediate pressure turbine section 14 and the low pressure turbine section 16.

In this embodiment, the speed of the blades 26 of the turbine 10 are maintained by the flow of nitrogen managed by the controller 40 between important rotor frequencies less than 1000 rpm. The controller 40 adjusts two nitrogen admission valves 44 to accomplish a higher flow of nitrogen through the turbine 10. This embodiment may provide flows of nitrogen greater than 7500 lbs/hr and the cooling may only be limited by maximum shell stress conditions on most units.

This method features controller 40 that includes a computer data acquisition and control system to coordinate the nitrogen admission valves 44, turbine speed, flow of nitrogen, turbine shell 20 and 22 temperatures, turbine rotor 18 temperatures, first stage metal temperature, axial shell to rotor clearance, and needed information as applicable. The controller 44 is equally applicable to any embodiment of the present disclosure. The controller 44 also avoids turbine over speed.

A combination of additional field equipment and additional project procedures are helpful in preventing overspeed condition of the turbine 10. The additional field equipment may include nitrogen stop valves upstream of the control valves 44 for nitrogen admission. The stop valves are preferably the "fail close" design for rapid valve travel to prevent overspeed condition of the turbine. This system and method is a most preferred embodiment for the reasons stated herein.

Figure 5:
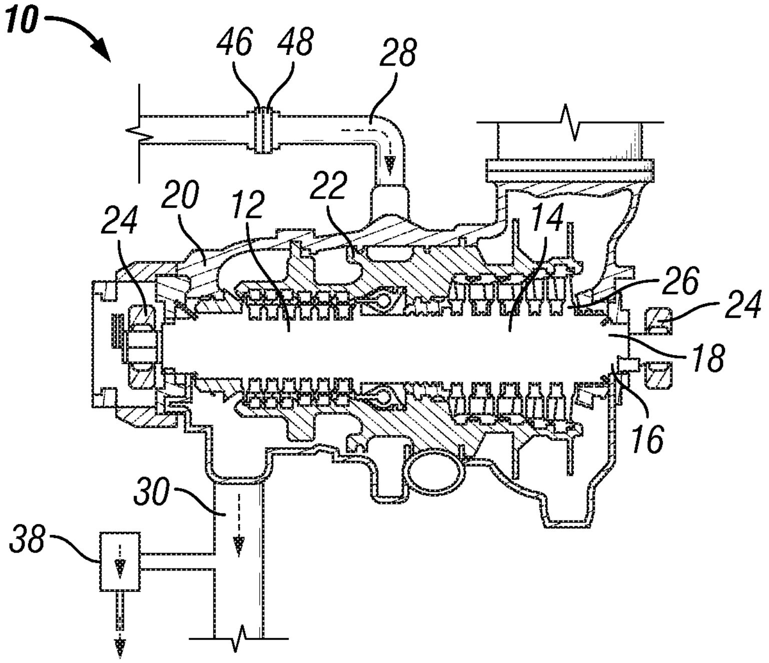
FIG. 5 is diagram including a cross sectional view of an embodiment of the present disclosure.

Referring to FIG. 5, an arrangement of the system and method similar to the design in FIG. 1 is shown, but with different nitrogen gas connection points. This system and method includes nitrogen gas inlet 46 through the main steam inlet piping 28 such that the flow of nitrogen moves from the main steam inlet piping 28 to the turbine 10 and from the turbine 10 to the cold reheat line 30. From the cold reheat line 30, the flow of nitrogen moves through the cold reheat drain pots 38 and is vented to the atmosphere. This embodiment may be a consideration for turbine cooling using the main steam inlet piping 28 as a method of nitrogen gas injection.

Another aspect of the present disclosure is the economic efficiencies and the benefits of the present disclosure. For example, a modern steam generating plant produces electricity at a cost of $18.00 US to $35.00 US per megawatt hour ("MW/hr") of operation. A nuclear powered plant produces electricity at a cost of about $18.00 US per MW/hr. A large coal plant produces electricity at a cost of about in the $23.00 to $28.00 range and a gas plant produces electricity at a cost of about $25.00 to $30.00 range. Older less efficient coal, oil or gas fired plants or gas fired turbines produce electricity at a cost that can be as high as $40 to $45.00 per MW/hr.

The time required to cool down a given steam turbine, for example, depends on its size and the operating temperatures and pressures. A nuclear plant turbine is the largest in physical size, but lower in operating temperature and pressure and usually in the megawatt capacity of more than about 1,000 MW. These units require approximately ten days to cool down by conventional methods. Fossil fired generating units using coal, oil, or gas can be as large as a nuclear steam turbine, but most units operate at higher pressures and temperatures. Most of the fossil units are in the about 400 to about 600 MW capacity size. The cool down of the smaller fossil units using conventional methods are from about five to about seven days.

When a plant is offline, the lost production cost can be much higher than the cost of operating the plant if the electrical demand is up. A nuclear plant can produce power at $18.00 per MW/hr, but the company may have to purchase power on the power grid that is generated by gas turbines that can cost as much as $45.00 per MW/hr. The following provides examples of daily operating costs and potential savings associated with the use of the methods and systems of the present disclosure.

TABLE 1

Daily Operating Costs and Potential Savings

| Type of Plant | Daily Operating/ MW Size | Costs & Potential Savings/ Product Cost | Daily Cost/Savings |
|---|---|---|---|
| Nuclear | 1000 | $18.00 | $432,000 |
| Fossil | 1000 | $25.00 | $600,000 |
| Fossil | 800 | $25.00 | $480,000 |
| Fossil | 600 | $25.00 | $360,000 |
| Fossil | 400 | $28.00 | $268,000 |
| Fossil | 200 | $30.00 | $144,000 |

This table shows that each day that can be saved in cooling down a given turbine, dependent of MW size and MW cost of product, can save a power plant from $144,000 to $600,000 per day. In a nuclear plant, that could be a cost saving amounting to as much as $3M in one shutdown for seven days. On an average size 600 MW plant, the saving could also be as high as $3M, with a smaller power production unit savings being as little as $0.5M. This shows that the production costs savings can be very substantial with a very high "value added" worth to this service to a given power plant operation.

Another embodiment of the present disclosure is directed to method of cleaning a turbine having internal moving components by employing the nitrogen flow of the present disclosure as a carrier gas for a cleaning agent. The method comprises flowing nitrogen gas through the turbine while the turbine is offline; and introducing a cleaning aerosol into the nitrogen gas to clean the turbine.

Figure 6:
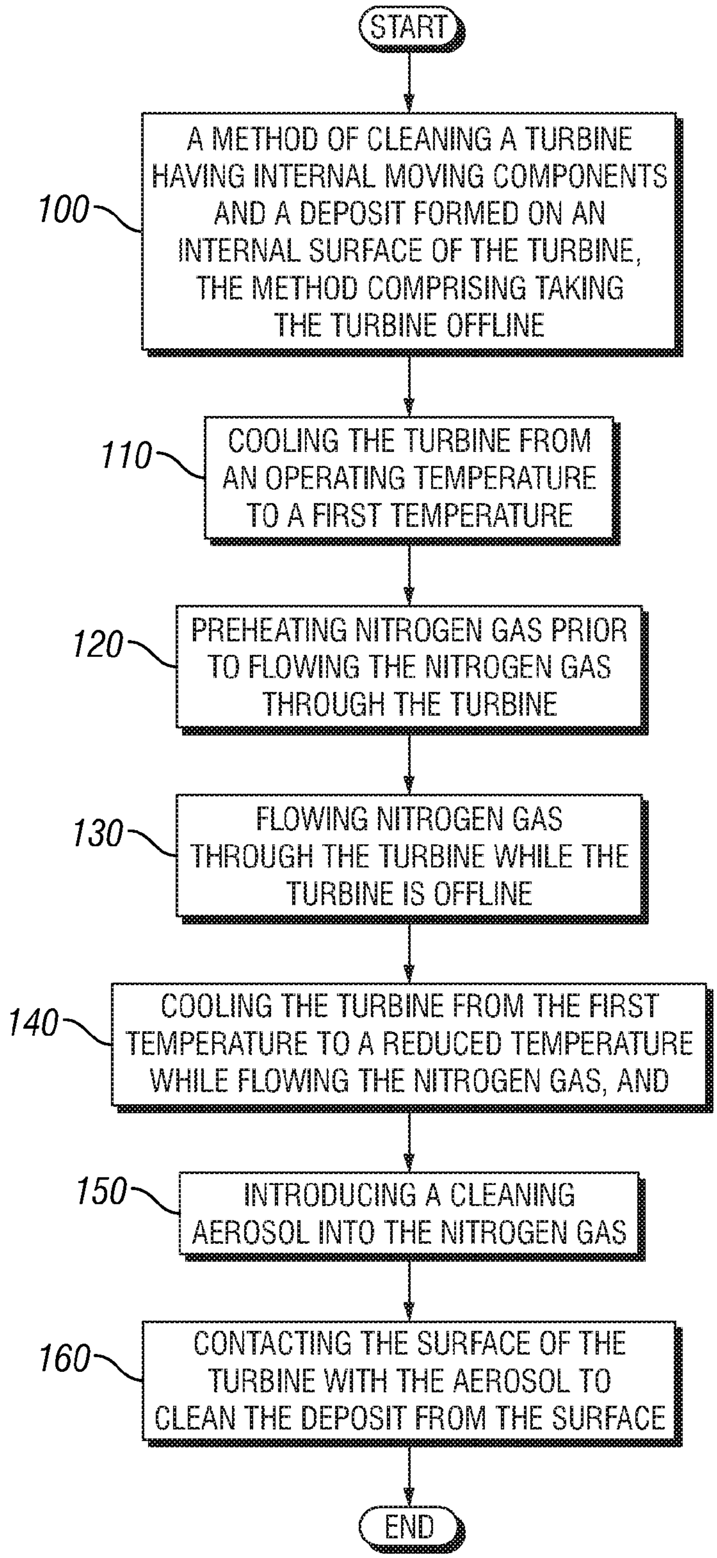
FIG. 6 is a flow chart illustrating a cleaning process, according to an embodiment of the present disclosure.

An embodiment of cleaning a turbine is illustrated in FIG. 6. The cleaning process begins by taking the turbine offline, as shown at 100. The turbine can then be cooled from the operating main turbine shaft temperature to a lower main turbine shaft temperature at which the cleaning will occur. For purposes of this patent application, the "operating main turbine shaft temperature" is the temperature at the main shaft while the turbine is operating online. The operating main shaft temperature can be several hundred or thousands of degrees Fahrenheit. Operating main turbine shaft temperatures can vary widely depending on the type and design of turbine employed, as well as the operating variables chosen, such as the RPMs at which the turbine operates. In an example, the operating main turbine shaft temperatures of a gas turbine can be greater than 1000° F., such as about 1100° F. to about 1200° F. As with the other ranges set forth in this application, temperatures outside of this range can be employed.

Cooling the turbine to the cleaning temperature can comprise one or more cooling steps. For example, the turbine can first cool on its own by, for example, leaving the turbine air intakes open and exposing the turbine to ambient atmospheric air (e.g., cooling by free convection) until the main turbine shaft temperature ranges from about 400° F. to about 700° F., such as about 500° to about 600° F.

After the turbine has cooled to a first desired temperature on its own, further cooling can be realized by introducing preheated nitrogen gas into the turbine, as illustrated at 120 and 130 of FIG. 6. The nitrogen gas can be preheated to any desired temperature. For example, the nitrogen can be preheated to a temperature ranging from about 300° F. to about 600° F. The temperature of the nitrogen gas can be chosen to reduce the mismatch temperature between the gas and the main turbine shaft, thereby reducing thermal stress on the turbine. For example, the mismatch temperature can be chosen to be about 100° F. or less. Thus, if the turbine is allowed to cool to a main turbine shaft temperature of 500° F., for example, than the nitrogen can be preheated to a temperature of about 400° F. In an alternative embodiment, it may be possible to heat the nitrogen near the operating main shaft temperature of the turbine, so that the nitrogen is introduced into the turbine immediately after it is taken off-line, with little or no ambient air cooling beforehand.

The nitrogen can be preheated using any suitable technique. In an embodiment illustrated in FIG. 8, nitrogen gas from a nitrogen source 475 flows through a nitrogen injection line 485 that is preheated to a suitable temperature for heating the nitrogen gas. For example, a heating mechanism 490 can be employed to heat the nitrogen injection line 485. The heating mechanism 490 can be any suitable device capable of heating the nitrogen gas. Examples of such devices include heating coils, heating elements, heating lamps, a heat exchange mechanism that employs a heating fluid or an induction heating device. While the heating mechanism 490 is illustrated outside the nitrogen injection line, other embodiments can employ a heating mechanism inside the nitrogen injection line.

Figure 7:
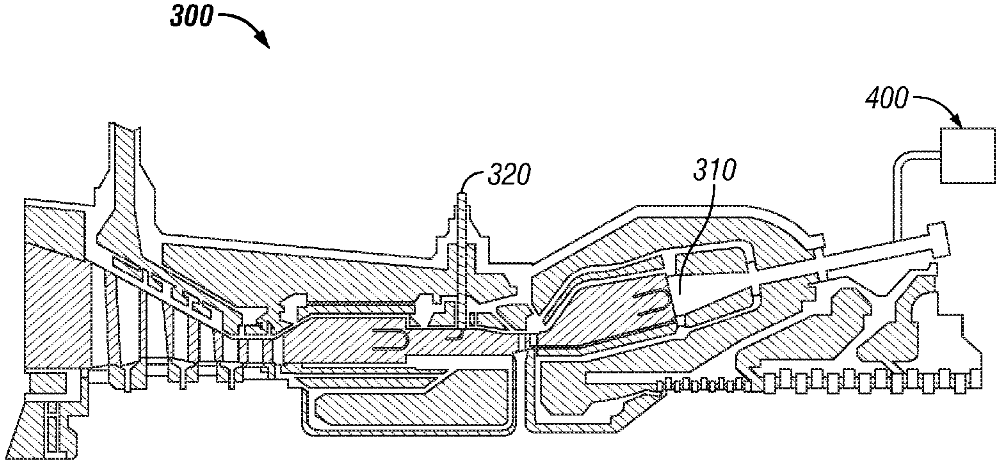
FIG. 7 illustrates a gas turbine that can be cleaned using the cleaning processes of the present disclosure.

The turbine of FIG. 7 includes a combustion air supply line 310 for introducing air used to fire the gas turbine. On this air supply line, the aerosol generator can be mounted upstream to blend the tempered nitrogen into the air stream to first cool and then start injecting the chemical fog for cleaning. Depending on the gas turbine design, there can be other air injection sites to which the nitrogen gas can be added. For example, nitrogen can potentially be introduced at injection site 320, either in addition to, or in alternative to, the compressed combustion air supply line 310. In an embodiment, the combustion air supply line 310 is the primary nitrogen injection site with the alternate sites for chemical injection considered, depending on the location of the deposits to be cleaned.

The nitrogen gas has essentially no water content. With the addition of concentrated (not diluted) water based cleaning emulsion, water vapor will be added to the nitrogen stream. For example, the nitrogen gas can have about 1% by volume water vapor or less after the aerosol is injected.

The nitrogen gas flow can be regulated in any suitable manner to provide continued cooling of the turbine. For example, the nitrogen gas flow can be introduced into the turbine slowly at first while monitoring the temperature of the turbine. The nitrogen flow can then be slowly increased to approximately the highest flow rate that is allowed with the nitrogen pumping equipment while still achieving the desired "target temperature". "Target Temperature" is the nitrogen temperature that maintains the chosen mismatch temperature. In an embodiment, as the turbine temperature declines, the target temperature can also be decreased (e.g., if the mismatch temperature difference is 80° F., than the nitrogen target temperature can be reduced so as to maintain a difference of about 80° F. between the main turbine shaft temperature and the nitrogen temperature.) In some systems, the nitrogen flow rate can be limited at high target temperatures, but may be increased as the target temperature decreases.

The nitrogen gas can continue flowing to aid in cooling the turbine to a desired cleaning temperature, at which point the cleaning aerosol can be introduced into the nitrogen gas, as illustrated at 140 and 150 of FIG. 6. The cleaning agent can then contact the surface of the turbine, as illustrated at FIG. 1. In this manner, deposits can be removed from the turbine surface.

The cleaning temperature can vary, depending on the type of deposits being removed and the cleaning agent employed in the aerosol. For example, it may be desirable to wait until the main turbine shaft temperature is below the boiling point of the cleaning agent and/or the nitrogen gas temperature is below the flash point of the cleaning agent. In an embodiment, the main turbine shaft temperature can range from, for example, about 100° F. or greater, such as, for example, about 200° F. to about 350° F.

Cooling of the turbine can continue as the turbine is cleaned with the aerosol. Alternatively, the nitrogen gas and/or turbine can be maintained at a relatively constant temperature during the cleaning process.

The flow rate of nitrogen flow 460 during the aerosol cleaning 150 can be any suitable flow rate that will carry the aerosol to the desired surfaces to be cleaned. For example, the flow rate of nitrogen at 460 can range from about 5000 SCFM to about 10000 SCFM.

The cleaning agent can comprise any suitable compound that is suitable for removing the particular types of deposits being cleaned from the turbine. In an embodiment, the cleaning agent can be capable of acting as a solvent to dissolve the deposits on the turbine surfaces. For example, the aerosol comprises at least one organic compound suitable for cleaning sulfur dioxide deposits from the turbine. In an embodiment, the cleaning agent can comprise at least one organic compound chosen from naptha, ethanol, terpenes, propanol, anionic surfactants and a product of hexylene glycol and diethanolamine. Examples of commercial cleaning agents include: Penetone 19 by West Penetone Inc., of Ville D'Anjou, QC, Canada; and Fyrewash F1, F2, F3, SB and F3-RR, made by RoChem Technical Services Group, LTD, which is located in the United Kingdom.

In an embodiment, the cleaning agent is not mixed with additional water, so that it is sprayed in a concentrated form (e.g., it contains only the water provided in the composition as shipped by the manufacturer). For example, the concentrated form can contain less than 50% by weight water, or in some cases, less than 20%, or less than 10% water, based on the total weight of the concentrated cleaning agent composition. In an embodiment, the cleaning agent composition comprises substantially no water, which can allow higher temperature cleaning than allowed with conventional water washing methods.

The finer the mist of the aerosol, the farther it can be carried by the nitrogen stream. In an embodiment, the majority of droplets in the aerosol are 100 microns or less in diameter. In another embodiment, the majority of droplets in the aerosol are 50 microns or less in diameter. The term "majority" is defined herein to mean 50% or more of the total aerosol droplets. In other embodiments, substantially all of the droplets are 100 microns or less, or 50 microns or less, in diameter.

Figure 8:
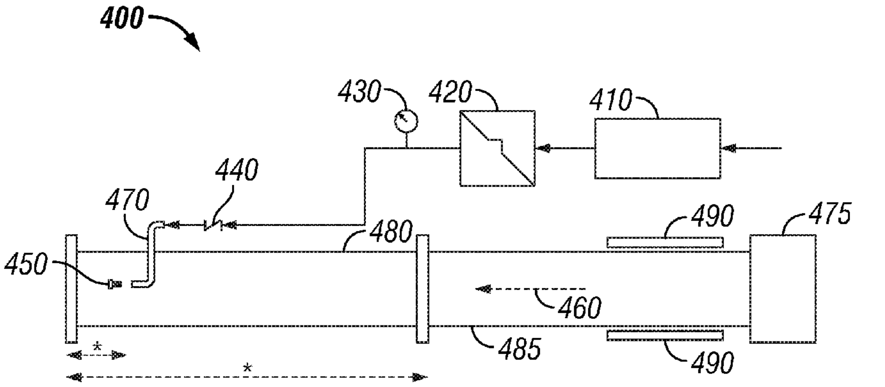
FIG. 8 illustrates an aerosol generator 400 in fluid communication with a nitrogen inlet flow, which can be the nitrogen inlet flow of a steam or gas turbine, such as the turbines of FIGS. 1-5 and 7, according to an embodiment of the present disclosure.

The aerosol can be formed using any suitable technique. One example of an aerosol generator 400 that can be used to form the aerosol is illustrated in FIG. 8. The aerosol generator 400 can comprise a filter 410 for filtering out small particulates that may clog the system, displacement pump 420, pressure indicator 430, check valve 440 and atomizer nozzle 450. Other suitable aerosol generators arrangements can also be employed.

As illustrated in FIG. 8, the aerosol generator 400 is in fluid communication with the turbine so as to be capable of forming the aerosol in the nitrogen flow 460 being introduced into the turbine. For example, a conduit 470 can be attached to an aerosol forming chamber 480, which either can be a pipe connectable to the gas inlet of the turbine or can be the gas inlet of the turbine itself. The cleaning agent can then be flowed via conduit 470 to nozzle 450, where it is sprayed into the nitrogen flow 460 being introduced at 310 into the turbine 300. The cleaning agent is flowed to the nozzle 450 at a suitable flow rate and pressure to provide the desired amount and size of aerosol droplets. For example, the concentrated cleaning agent can be flowed through the aerosol generator 400 at a rate ranging from about 0.1 gpm to about 10 gpm (e.g., about 0.5 gpm) and at a pressure ranging from about 500 psi to about 15,000 psi, such as about 1000 psi to about 10,000 psi.

The aerosol forming chamber 480 allows introduction of the nitrogen flow and aerosol into the turbine at 310 (FIG. 7). In this manner, the turbine internals can be cleaned by the parts being wetted by the fogged chemistry and potentially also by mechanical action of the chemical droplets impinging the metal surface by the high velocity nitrogen gas flow. This cleaning process can result in one or more of the following advantages: good distribution of the cleaning agent in the nitrogen gas flow; solvent type cleaning agent condensing on a hot metal using a heated gas carrier can deliver superior solubility and allows the cleaning process to be carried out relatively quickly; mechanical action of the chemical droplets impinging the metal surfaces at high velocities in the nitrogen stream; eliminate or reduce outside chloride or sodium contamination or other contamination that can occur in water based processes; the ability to integrate both the cooling and cleaning processes; the system can be dehydrated upon completion; reduced chemical waste and reduced water waste compared with water based processes; a reduction in the total cooling and cleaning process time compared to standard liquid cleaning techniques and the ability to perform cleaning at higher temperatures.

If desired, a water rinse can be performed after the aerosol cleaning takes place in order to remove residual cleaning agent from the turbine. This water rinse can be performed in any suitable manner. In one embodiment, the water rinse can be carried out as an aerosol water rinse, in which the water aerosol is generated by the aerosol generator of FIG. 8, similarly as discussed above for the cleaning agent. However, in at least some embodiments, water rinsing may not be necessary because the cleaning agent used can be primarily a hydrocarbon based solvent that will burn on ignition of the turbine.

After the aerosol cleaning is completed, the turbine can continue to be cooled down using the nitrogen flow or any other cooling method. In another embodiment, the turbine can be brought back on line without substantial cooling occurring after the cleaning process is completed. Nitrogen can also continue flowing through the turbine after aerosol cleaning in order to dry and/or dehumidify the turbine. For example, nitrogen can continue flowing through the turbine for 5 minutes or longer after stopping the injection of aerosol into the nitrogen flow. In an embodiment, the nitrogen can continue flowing until the dew point of the nitrogen flow reaches a desired level, such as, for example, less than 40 degrees Fahrenheit.

Although the aerosol cleaning process was discussed above as occurring during a turbine cooling process, the cleaning process can alternatively be carried out during a heating process. For example, the turbine can potentially be heated by the nitrogen gas as the aerosol is introduced, in a manner similar to that described above.

While the illustrative embodiments of the present disclosure were directed to turbines, other devices can also be cleaned using aerosol in a dry nitrogen gas, as described above. Examples of such devices include cleaning and degassing pipelines, towers, reactors and other hydrocarbon process equipment. In such applications, organic vapors and/or deposits can be cleaned from the devices.

Having described the disclosure above, various modifications of the techniques, procedures, material and equipment will be apparent to those in the art. It is intended that all such variations within the scope and spirit of the appended claims be embraced thereby.

What is claimed is:

1. A method of cleaning a turbine with a deposit thereon, the method comprising:

flowing nitrogen gas through the turbine, wherein the turbine has internal moving components;

introducing a cleaning aerosol into the nitrogen gas to clean the turbine, the aerosol comprising at least one organic compound suitable for cleaning organic vapors or deposits from the turbine; and contacting the internal moving components with the aerosol so as to remove deposits from the components.

2. The method of claim 1, wherein the at least one organic compound is chosen from naptha, ethanol, terpenes, propanol, anionic surfactants and a product of hexylene glycol and diethanolamine.

3. The method of claim 1, wherein the aerosol comprises a majority of droplets that are 100 microns or less in diameter.

4. The method of claim 1, wherein the nitrogen gas is heated to a temperature of about 100.degree. F. or greater before introducing the aerosol.

5. The method of claim 1, wherein the nitrogen gas is at temperature ranging from about 200.degree. F. to about 350.degree. F. before introducing the aerosol.

6. The method of claim 1, wherein the nitrogen gas comprises essentially no water prior to introduction of the aerosol.

* * * * *